(12) United States Patent
Merour et al.

(10) Patent No.: US 8,596,486 B2
(45) Date of Patent: Dec. 3, 2013

(54) WASHING LIQUID TANK FOR AUTOMOBILE

(75) Inventors: Sylvain Merour, Vertou (FR); Ghislain Gaudiau, Ancenis (FR); Gerard Jeuffe, Bazemont (FR); Nicolas Magnier, Clamart (FR)

(73) Assignees: Peugeot Citroen Automobiles SA, Velizy Villacoublay (FR); Tristone Flowtech Solutions (TFS), Carquefou (FR)

( * ) Notice: Subject to any disclaimer, the term of this patent is extended or adjusted under 35 U.S.C. 154(b) by 807 days.

(21) Appl. No.: 12/668,117

(22) PCT Filed: Jun. 30, 2008

(86) PCT No.: PCT/FR2008/000930
§ 371 (c)(1),
(2), (4) Date: May 11, 2010

(87) PCT Pub. No.: WO2009/016297
PCT Pub. Date: Feb. 5, 2009

(65) Prior Publication Data
US 2010/0243659 A1   Sep. 30, 2010

(30) Foreign Application Priority Data

Jul. 11, 2007  (FR) .................................. 07 05015

(51) Int. Cl.
*B65D 25/04* (2006.01)

(52) U.S. Cl.
USPC .............. 220/501; 237/12.3 R; 237/12.3 B; 123/41.51; 165/41; 165/51; 165/95; 165/104.11; 165/104.32; 165/135; 239/129; 239/130; 239/284.1; 239/302

(58) Field of Classification Search
USPC ........... 220/501; 165/41, 51, 95, 104.32, 135; 123/41.51; 237/12.3 B, 12.3 R; 239/129, 239/130, 284.1, 302
See application file for complete search history.

(56) References Cited

U.S. PATENT DOCUMENTS

| 7,311,268 | B2 | 12/2007 | Sporer et al. |
| 2002/0134857 | A1 | 9/2002 | Zimmer |
| 2009/0242171 | A1 | 10/2009 | Jeuffe |

FOREIGN PATENT DOCUMENTS

| DE | 37 04 325 | 8/1988 |
| DE | 10 2005 058 513 | 6/2007 |
| EP | 0 456 934 | 11/1991 |
| FR | 2 419 849 | 10/1979 |
| FR | 2 609 437 | 7/1988 |
| FR | 2 763 549 | 11/1998 |
| FR | 2 855 079 | 11/2004 |
| FR | 2 875 763 | 3/2006 |
| FR | 2 884 477 | 10/2006 |

OTHER PUBLICATIONS

International Search Report dated Feb. 13, 2009, corresponding to PCT application.

*Primary Examiner* — Anthony Stashick
*Assistant Examiner* — Elizabeth Volz
(74) *Attorney, Agent, or Firm* — Young & Thompson

(57) ABSTRACT

A washing liquid tank for a vehicle, includes a vertically extending wall (1) that divides the tank into a first chamber (2) including at least one liquid filling opening (4) in the lower portion thereof, and a second chamber (3) including at least one pumping opening (5) in the lower portion thereof, the second chamber having a wall that is common with a reheating body (6), the first and second chambers communicating together through a communication opening (7) formed in the lower portion of the wall (1) in order to allow the filling of the second chamber (3). The tank is characterized in that the second chamber has a volume lower than that of the first chamber and in that the first and second chambers (2, 3) further communicate together via an air passage (8) provided at the upper portion of the second chamber (3).

17 Claims, 3 Drawing Sheets

WASHING LIQUID TANK FOR AUTOMOBILE

BACKGROUND OF THE INVENTION

1. Field of the Invention

This invention relates to a washing fluid reservoir for a motor vehicle.

It relates more particularly to a reservoir for washing fluid that is to be sprayed onto windows or lights of a motor vehicle, of the type that is equipped with a vertical extension partition that divides the reservoir into a first chamber that comprises a fluid fill orifice in its upper part and a second chamber that comprises a pumping orifice in its lower part, whereby said second chamber has a wall that is common with a heating element, whereby said second chamber extends at least partially around said heating element so as to ensure the heating of the fluid that is contained in said second chamber, whereby said first and second chambers communicate with one another via a communicating orifice in the lower part of said partition so as to allow the filling of said second chamber from said first chamber.

2. Description of the Related Art

In a conventional manner, the spraying of the washing fluid onto the windshield or the lights of the vehicle is ensured by one or more spraying elements of the nozzle type, supplied with washing fluid by a feed pump from a reservoir that contains washing fluid. The washing fluid usually consists of a mixture of water and alcohol in a high proportion. Despite the presence of alcohol, the quality of washing remains mediocre.

To improve the quality of washing, it is known to heat the washing fluid. The heating of the washing fluid also makes it possible to reduce the proportion of alcohol in the mixture and thus to contribute to the preservation of the environment.

As the patent FR 2 884 477 mentions, window-washing devices in which the heating of the washing fluid is carried out by means of heating electrical resistors are known, placed at various locations in the washing circuit (see the Patents FR 2 855 079, FR 2 763 549, EP 0 456 934, FR 2 419 849 and US 2002/0134857). The presence of electrical resistors increases the energy consumption of the vehicle and requires an additional component.

An advantageous solution that avoids both additional energy consumption and the addition of other components is described in particular in the French patent application FR 2 609 437 and the German patent application DE 37 04 325. The patent applications FR 2 609 437 and DE 102005058513 propose a washing fluid reservoir that is heated upon contact with a duct that conveys a hot fluid. These solutions are not very effective in terms of heating. DE 37 04 325 proposes a washing fluid reservoir whose heating means comprise a common wall, forming a heat-exchange surface, between the washing fluid reservoir and an expansion receptacle or a box for degassing a coolant circuit of the heat engine of the vehicle.

The patent application FR 2 884 477 considers this solution in which the washing fluid reservoir and the expansion receptacle are juxtaposed to be unsatisfactory because the heat-exchange surface between the coolants and the washing fluids is limited to a single lateral face of the expansion receptacle and proposes integrating, for the most part, the expansion receptacle inside the reservoir so as to increase the heat-exchange surface between the coolants and washing fluids. This latter solution, if it allows satisfactory heating of the window-washing fluid, presents the drawback of impairing the rise in temperature of the cooling circuit fluid due to significant heat losses at the degassing box to the fluid reservoir.

Another solution in which calories that are necessary to the elevation of the temperature of the washing fluid contained in a reservoir of the vehicle housed in the engine compartment of this vehicle are sampled from the degassing box or expansion receptacle of its cooling circuit is described in the French patent application FR 2 875 763. In this solution, the reservoir at least partially surrounds the degassing box by providing between them a separation space of determined thickness in which is integrated a double-partition hollow element that delimits a thermal insulating volume that is closed on itself.

The purpose of this solution is to ensure that the sampling of calories is done under particular conditions preventing the inherent temperature of the degassing box from undergoing sudden variations with the negative impact that can arise therefrom on the proper operation of the engine.

BRIEF SUMMARY OF THE INVENTION

One object of this invention is to propose a washing fluid reservoir of the above-mentioned type whose design, although simplified, makes it possible to quickly reach and to maintain a high temperature of the fluid that is to be sprayed inside a portion of said reservoir by avoiding, if this is desired, an additional energy consumption and the addition of other components without hampering the proper operation of the engine, the rise in temperature of the coolant not being impaired.

For this purpose, the invention has as its object a washing fluid reservoir for a motor vehicle, whereby the reservoir is equipped with a vertical extension partition that divides the reservoir into a first chamber that comprises at least one fluid fill orifice in its upper part and a second chamber that comprises at least one pumping orifice in its lower part, whereby said second chamber has a wall that is common with a heating element, whereby said second chamber extends at least partially around said heating element so as to ensure the heating of the fluid that is contained in said second chamber, whereby said first and second chambers communicate with one another via a communicating orifice in the lower part of said partition so as to allow the filling of said second chamber from said first chamber, characterized by the fact that the second chamber has a smaller volume than that of the first chamber and that said first and second chambers communicate with one another via an air passage that is provided in the upper part of said second chamber so as to allow the exhaust of air from the latter to said first chamber during the filling of the reservoir.

Because the reservoir is designed with at least two chambers, one so-called cold chamber, and the other so-called hot chamber, which has a smaller inside volume compared to the cold chamber for the purpose of heating a smaller quantity of washing fluid and since there is no opening of the hot chamber to the open air, the desired heating efficiency is obtained. In other words, the inside volume of the second so-called hot chamber is less than the inside volume of the first so-called cold chamber, which makes it possible to obtain the desired efficiency. Likewise, the capacity of the second so-called hot chamber is less than the capacity of the first so-called cold chamber.

According to a preferred embodiment of the invention, the air passage, defined by a channel, is combined with blocking means that make it possible to prevent the circulation of fluid from said first chamber to said second chamber via said channel.

Thus, the presence of the air passage allows an easy and quick filling of the second chamber called a hot chamber by air exhaust through said passage, and its combination with blocking means make it possible to prevent a circulation of fluid between said chambers, circulation that would not make it possible to obtain and to maintain the desired temperature in the second chamber. By the same token, these blocking means also prevent fluid from circulating between said chambers when the vehicle is on a steep grade or when the vehicle runs over obstacles, such as "speed humps," which create disruptions, called lifting movements, inside said reservoir.

BRIEF DESCRIPTION OF THE DRAWINGS

The invention will be better understood from reading the following description of embodiments with reference to the accompanying drawings in which.

DETAILED DESCRIPTION OF THE PREFERRED EMBODIMENTS

Figure 1:
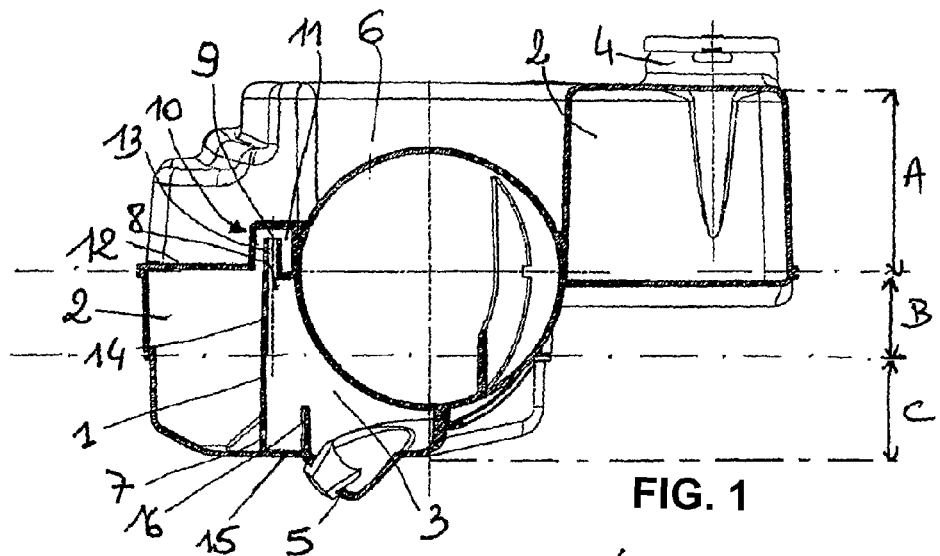
FIG. 1 shows a cutaway view of the fluid reservoir according to the invention taken at the level of the air passage provided in the upper part of the second chamber.
Figure 2:
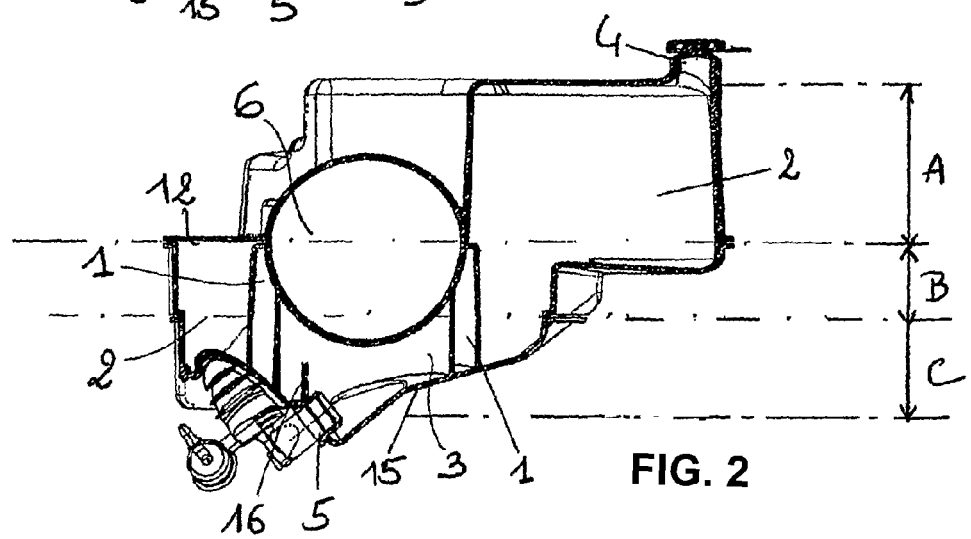
FIG. 2 shows a cutaway view of the fluid reservoir according to the invention taken at the level of the double partition.
Figure 3:
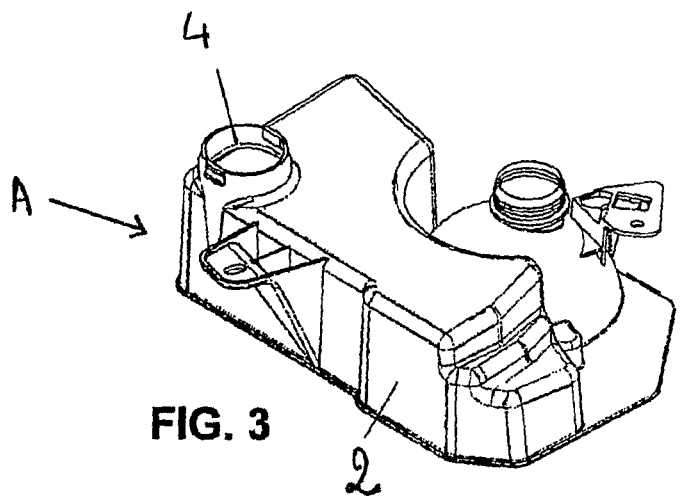
FIG. 3 shows a partial perspective view taken from above the upper part of the reservoir.
Figure 4:
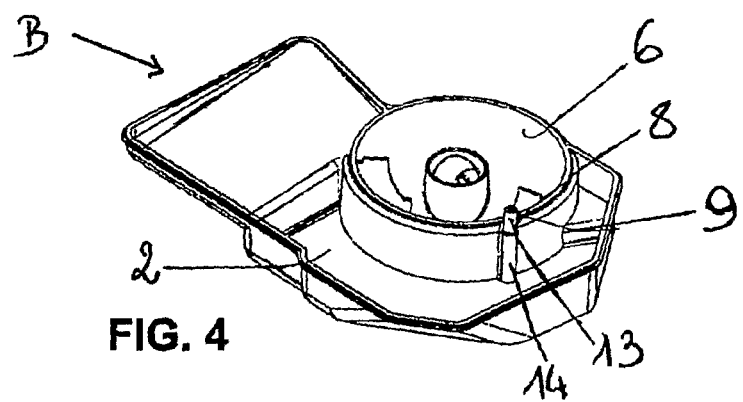
FIG. 4 shows a partial perspective view taken above the intermediate part of the reservoir.
Figure 5:
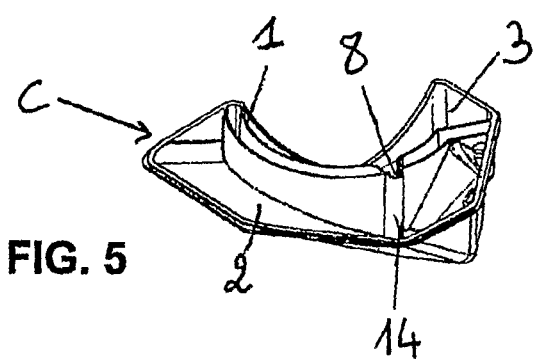
FIG. 5 shows a partial perspective view taken from above the lower part of the reservoir.
Figure 6:
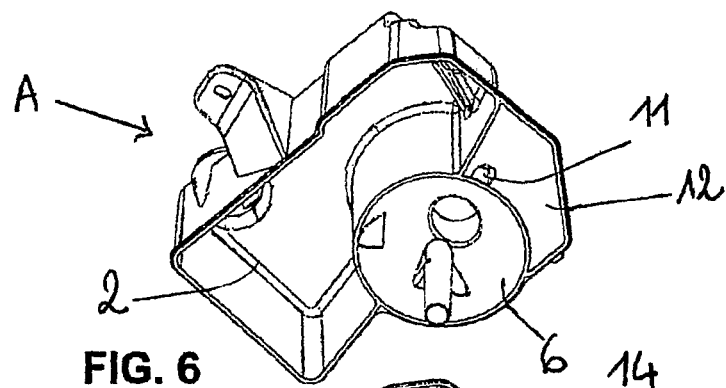
FIG. 6 shows a partial perspective view taken from below the upper part of the reservoir.
Figure 7:
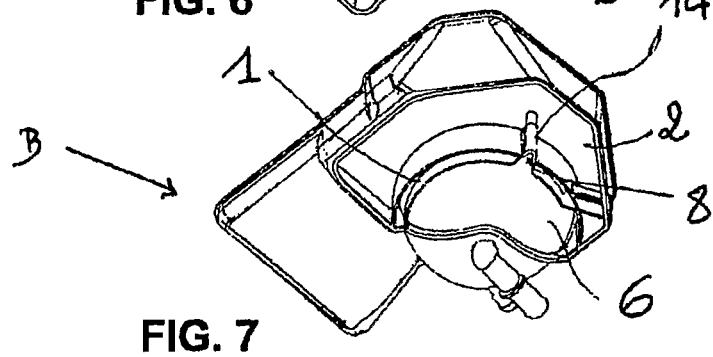
FIG. 7 shows a partial perspective view taken from below the intermediate part of the reservoir.
Figure 8:
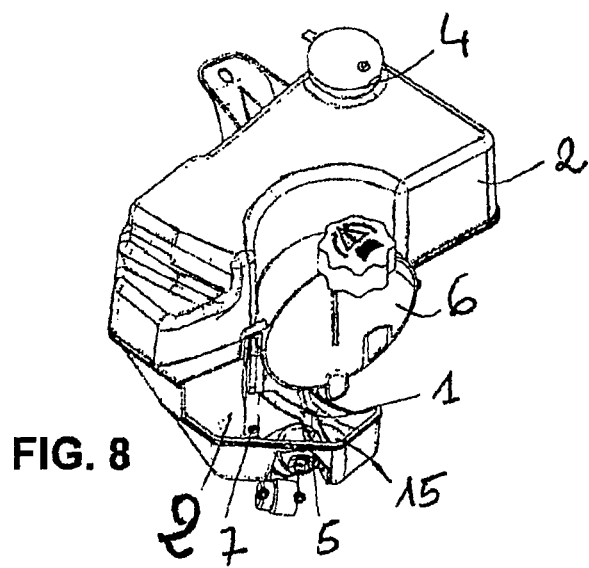
FIG. 8 shows a partial perspective view of the reservoir of which half the degassing box and a portion of the upper and intermediate parts have been omitted for allowing a perspective visualization of the inside of the reservoir in the assembled state of said parts.

As mentioned above, the invention has as its object a washing fluid reservoir for a motor vehicle, whereby this washing fluid, usually water that is optionally mixed with a suitable additive, is more particularly intended to be sprayed or pulverized onto the glass of the windshield, the rear window, or onto the lights or other glass wall of the vehicle, by means of nozzles or the like installed facing the windshield wiper blades mounted on the surface to be cleaned, whereby this washing fluid is heated from calories originating from the box for degassing the cooling circuit of the vehicle engine.

This reservoir is equipped with a vertical extension partition 1 that divides the reservoir into a first so-called cold chamber 2, comprising in its upper part a fluid fill orifice 4 that is closed in an airtight manner by a plug and a second so-called hot chamber 3 of low volume that comprises in its lower part at least one pumping orifice 5 by which one or more pumps, not shown, supply window-washing nozzles or spray-washing nozzles of the vehicle with washing fluid. The second chamber 3 has a wall that is common with a heating element 6, whereby this wall forms a heat-exchange surface between the second chamber 3 and the heating element 6.

In the examples that are shown, the heating element 6 comprises a degassing box 6 that is part of a cooling circuit of the engine of the motor vehicle. This degassing box, usually with a spherical profile, comprises, in a manner that is known in the art, a removable plug for allowing the filling of the cooling circuit with fluid that is suitable for this use. This fluid generally consists of water to which is added, in a suitable proportion, an additive that is itself known in the art, suitable for reducing the surface tension of the fluid and for limiting its evaporation during the operation of the engine.

The degassing box 6 ensures the separation between the fluid and its vapor or other gaseous products, and even the air that is present or introduced into the cooling circuit during its filling, whereby the temperature inside this box is more or less quickly brought, as soon as the engine is operating, to a value that is generally between 60 and 90°, according to the vehicle that is involved.

In a conventional way, this degassing box comprises a safety valve, not shown. The circuit is equipped with an overflow orifice that limits the amount of fluid contained therein upon the occasion of its being reset to its initial level or its subsequent adjustment.

The detail of the remainder of the cooling circuit of the motor vehicle, in particular the circulation pipe in the cylinder head of the engine and the connection to the radiator, is not provided to the extent that it does not relate directly to the invention.

The second chamber 3 of the reservoir extends at least partially around said heating element 6 so as to ensure the heating of the fluid that is contained in said second chamber 3. Using this arrangement, only the contents of the second chamber 3, which represents a small volume relative to that of the first chamber 2, is subjected to heating. In the examples that are shown, the heating element 6 that is formed by the degassing box 6 assumes a spherical shape.

These first and second chambers 2, 3 communicate with one another via a communication orifice 7 in the lower part of said partition 1 so as to allow the filling of the second chamber 3 from the first chamber 2. This communication orifice 7 between said chambers is preferably calibrated to limit the heat exchanges between said chambers. This orifice ensures the supply of the second chamber 3 with unheated washing fluid from the first chamber 2. The first chamber 2 thus constitutes the equivalent of a reserve of unheated washing fluid for the second chamber 3 whose volume is generally between 20 and 200 cc.

In a manner that is characteristic of the invention, the first and second chambers 2, 3 also communicate with one another via an air passage 8 that is provided in the upper part of the second chamber 3. This air passage 8 makes possible the exhaust of air from the second chamber 3 to the first chamber 2 during the filling of the reservoir.

In the examples that are shown, this air passage that is defined by a channel 8 is combined with blocking means 10 that make it possible to prevent the circulation of fluid from the first chamber 2 to the second chamber 3 via said channel 8. The absence of fluid circulation makes it possible, on one hand, again, to maintain a high temperature of the washing fluid in the second chamber 3, and, on the other hand, to shape the first chamber to a maximum fill level that exceeds the fill level of the second chamber without running the risk of fluid circulating between said chambers. In the examples that are shown, the first chamber 2 thus offers a portion of its volume that is formed in the upper part of the reservoir whereas the second chamber 3 is essentially formed in the lower part of the reservoir.

In a first embodiment, according to the one that is shown in the figures, the blocking means comprise an air trap 10 that surrounds the outlet of the channel 8 in the first chamber 2. This air trap, here of the baffle type, comprises a cavity 11 that is provided in an inside wall 12 that delimits the first chamber upward, and into which said channel 8 empties. This inside wall 12 forms the ceiling of the first chamber. It should be noted that in the case of washing fluid gel, for example in the absence of anti-gel, the air trap can be used as a volume for expansion of the washing fluid during the solidification of said fluid.

In other words, the cavity 11 forms an expansion volume of the washing fluid that is common with the first and second chambers 2, 3, whereby this volume is arranged at the top of the partition 1 that separates the first and second chambers 2, 3.

The second chamber 3 is entirely closed upward by the partition 1 and by the lower portion of the heating element 6. The air passage 8, defined by a channel 8, extends via said partition 1 and empties into the first chamber 2 by an evacuation orifice 9 that is directed upward.

In its upper part, the channel 8 is defined by a tubular element 13 that forms said evacuation orifice 9 and that empties out close to the bottom of the cavity 11. The channel 8 thus empties out in the manner of a chimney into the cavity 11. This chimney plays the role of a chimney for evacuating the air that is optionally present or introduced into said second chamber 3, while the cavity 11 into which the channel 8 empties forms the equivalent of a baffle.

In the examples that are shown, the channel 8 is formed in an approximately vertical rib 14 that projects over the surface of said partition 1 from the side of the first chamber 2.

In the examples that are shown, the partition 1 that separates said first and second chambers 2, 3 has a double wall, and the rib 14 forms a single-wall interruption. The presence of a double-walled partition makes it possible to ensure better thermal insulation of the contents of the second chamber 3.

The communication orifice 7, between the first and second chambers allowing the filling of the second chamber from the first chamber, is installed on the lower part of the rib 14. This communication orifice 7 is raised relative to a wall that forms the bottom 15 of the reservoir to prevent a clogging of said orifice by deposits accumulated at the bottom of said reservoir.

In general, this reservoir comprises a deflecting means 16 that is arranged in the second chamber 3 in front of the communication orifice 7, whereby this deflector 16 is able to deflect the fluid that enters relative to the pumping orifice 5. Thus, during an expulsion of the fluid from the second chamber 3, the fluid that is drawn in is not the one directly obtained from the first chamber 2.

In another embodiment that is not shown, the means for blocking the air passage 8 between the first and second chambers 2, 3 comprise an air-permeable and fluid-impermeable membrane. This membrane can be housed in the separating partition of the first and second chambers when the air passage 8 is made directly in said partition 1. This air-permeable and fluid-impermeable membrane can also, in the case of a configuration according to the one that is shown in the figures in which the air passage is defined by a channel 8, be installed at the free end of said channel.

In another embodiment that is not shown, the air passage 8 is combined with blocking means that make it possible to prevent the circulation of the fluid from said first chamber 2 to said second chamber 3, whereby these blocking means comprise a moving element such as a valve, a ball, a float, or the like. This moving element is generally arranged in the second chamber 3 and preferably has a movement that is slaved to the fluid level inside the second chamber 3.

It should be noted that using this design, the alcohol vapors that result from heating the alcohol that is contained in the washing fluid of the second chamber are condensed quickly within the volume that is formed by the first chamber such that any leak of alcohol toward the outside of the reservoir is prevented.

These arrangements make it possible to shape the first chamber 2 such that its maximum fill level exceeds the fill level of the second chamber 3 without running the risk of uncontrolled circulation of washing fluid between these two chambers.

In the examples that are shown, the fluid reservoir is formed by three parts, shown at A, B and C in the figures, that are superposed and injection-molded. These parts respectively constitute an upper part A, an intermediate part B, and a lower part C that are assembled together by continuous welds forming original sealing means between said superposed parts. Using the adopted design, an additional fixture sealing, such as a joint, is not necessary. Thus, chambers and heating elements are produced only from three parts.

It is noted that the three superposed parts A, B, and C together delimit the first chamber 2. The intermediate and lower parts B, C delimit, with the wall that is common with the second chamber 3 and the degassing box 6, the second chamber 3. The upper and intermediate parts A, B together form the degassing box 6 that assumes here the shape of a spherical box. The intermediate and lower parts B, C, comprise the partition 1 that is formed by a double insulating wall, whereby this partition 1 for separating the first and second chambers from one another comprises the communication orifice 7 between said chambers.

The upper part A therefore assumes the shape of a cover that comprises—beside the half-sphere that forms the upper part of the degassing box 6—a cavity that forms the upper part of the first chamber 1, whereby the top face of the cover is equipped with the cavity 11 that forms an air trap. The intermediate part B that is designed to be connected by a joint plane to the part A comprises the lower half-sphere of the degassing box, the wall that is common with the half-sphere and the second chamber, the upper part of the separating partition between the first and second chambers with the upper part of the channel 8 and the median zone of the first chamber 2. Finally, the lower part C delimits the bottoms of the first and second chambers 2, 3 and comprises the lower part of the separating wall between said chambers.

Because of this design, the degassing box 6—at its lower part—can comprise a connecting pipe to the cooling fluid circuit of the engine that in no way interferes with the remainder of the reservoir. The common wall between the degassing box 6 and the second chamber 3 has sufficient surface area to ensure a rapid rise in temperature and a holding of said temperature within the second chamber 3.

The invention claimed is:

1. A washing fluid reservoir for a motor vehicle, the reservoir comprising:
    a vertical extension partition that divides the reservoir into
        a first chamber that comprises at least one fluid fill orifice in an upper part thereof and a second chamber that comprises at least one pumping orifice in a lower part thereof, said second chamber having a wall that is common with a heating element, said second chamber extending at least partially around said heating element so as to ensure heating of the fluid that is contained in said second chamber, said first and second chambers communicating with one another via a communicating orifice in the lower part of said partition so as to allow filling of said second chamber from said first chamber,
    wherein the second chamber has a smaller volume than that of the first chamber, and said first and second chambers communicate with one another via an air passage that is provided in the upper part of said second chamber so as to allow the exhaust of air from the second chamber to said first chamber during the filling of the reservoir.

2. The reservoir according to claim 1, wherein the air passage is combined with blocking means that enable preventing the circulation of fluid of said first chamber to said second chamber, said blocking means comprising an air-permeable and fluid-impermeable membrane.

3. The reservoir according to claim 1, wherein the air passage is combined with blocking means that enable preventing the circulation of fluid from said first chamber to said second chamber, the blocking means comprising a moving element of at least one of a valve, a ball, or a float.

4. The reservoir according to claim 1, further comprising a deflector means for deflecting that is installed in said second chamber in front of said communicating orifice and is able to deflect the fluid that enters relative to said pumping orifice.

5. The reservoir according to claim 1, wherein said heating element comprises a degassing box that is part of a cooling circuit of the engine of the motor vehicle.

6. The reservoir according to claim 1, wherein the reservoir is formed by three parts that are superposed and injection-molded and that constitute an upper part, an intermediate part, or a lower part that are assembled together by continuous welds that form original sealing means between said superposed parts.

7. The reservoir according to claim 1, wherein the air passage, defined by a channel, is combined with blocking means that enable preventing the circulation of fluid from said first chamber to said second chamber via said channel.

8. The reservoir according to claim 7, wherein said second chamber is completely closed upward by said partition and by the lower part of said heating element, and said air passage, defined by the channel, extends via said partition and empties into said first chamber via an evacuation orifice that is directed upward.

9. The reservoir according to claim 8, further comprising sealing means comprising an air trap that comprises a cavity, wherein said channel is, in an upper part thereof, defined by a tubular element that forms said evacuation orifice and that empties out close to the bottom of said cavity.

10. The reservoir according to claim 7, wherein said blocking means comprise an air trap that surrounds the opening of the channel in said first chamber.

11. The reservoir according to claim 10, wherein said air trap comprises a cavity that is provided in an inside wall that delimits said first chamber upward and into which said channel empties.

12. The reservoir according to claim 11, wherein the cavity forms a volume for expansion of the washing fluid that is common with the first and second chambers, the volume being arranged at the top of the partition that separates the first and second chambers.

13. The reservoir according to claim 7, wherein said channel is formed in an approximately vertical rib that projects over a surface of said partition from a side of said first chamber.

14. The reservoir according to claim 13, wherein said partition has a double wall, and
said rib forms a single-wall interruption.

15. The reservoir according to claim 14, wherein said communicating orifice is provided on a lower part of said rib.

16. The reservoir according to claim 13, wherein said communicating orifice is provided on a lower part of said rib.

17. The reservoir according to claim 16, wherein said communicating orifice is raised relative to a wall that forms a base of the reservoir.

* * * * *

UNITED STATES PATENT AND TRADEMARK OFFICE
CERTIFICATE OF CORRECTION

PATENT NO. : 8,596,486 B2  Page 1 of 1
APPLICATION NO. : 12/668117
DATED : December 3, 2013
INVENTOR(S) : Merour et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 930 days.

Signed and Sealed this

Twenty-second Day of September, 2015

Michelle K. Lee
*Director of the United States Patent and Trademark Office*